US011582440B2

(12) United States Patent
Do et al.

(10) Patent No.: US 11,582,440 B2
(45) Date of Patent: Feb. 14, 2023

(54) DISPLAY APPARATUS, HEAD-MOUNTED DISPLAY APPARATUS, IMAGE DISPLAY METHOD, AND IMAGE DISPLAY SYSTEM

(71) Applicant: SAMSUNG DISPLAY CO., LTD., Yongin-si (KR)

(72) Inventors: Yunseon Do, Yongin-si (KR); Jaejoong Kwon, Yongin-si (KR); Chio Cho, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/209,243

(22) Filed: Mar. 23, 2021

(65) Prior Publication Data
US 2021/0211641 A1 Jul. 8, 2021

Related U.S. Application Data

(63) Continuation of application No. 15/139,766, filed on Apr. 27, 2016, now abandoned.

(30) Foreign Application Priority Data

Aug. 31, 2015 (KR) ........................ 10-2015-0123014

(51) Int. Cl.
H04N 13/344 (2018.01)
G09G 3/20 (2006.01)
(Continued)

(52) U.S. Cl.
CPC ......... *H04N 13/344* (2018.05); *G02B 27/017* (2013.01); *G02B 27/0172* (2013.01);
(Continued)

(58) Field of Classification Search
CPC .............. H04N 13/044; H04N 13/025; H04N 13/0271; G02B 27/017; G02B 27/0172; G02B 27/2228; G09G 3/2003
See application file for complete search history.

(56) References Cited

U.S. PATENT DOCUMENTS 5,659,327 A  8/1997 Furness, III et al.
6,653,765 B1  11/2003 Levinson et al.
(Continued)

FOREIGN PATENT DOCUMENTS

CN  106063261 A  10/2016
JP  2002318652 A  10/2002
(Continued)

OTHER PUBLICATIONS

Chinese Office Action for Application No. 201610625671.6 dated Mar. 20, 2020, citing the above reference(s).
(Continued)

Primary Examiner — Sarah Lhymn
(74) Attorney, Agent, or Firm — Cantor Colburn LLP

(57) ABSTRACT

A display apparatus includes a first pixel and a second pixel. Each of the first and second pixels includes a first sub-pixel which emits light having a first color, a second sub-pixel which emits light having a second color different from the first color, a third sub-pixel which emits light having a third color different from the first and second colors, and an infrared sub-pixel which emits infrared light. The infrared light emitted from the infrared sub-pixel in the first pixel and the infrared light emitted from the infrared sub-pixel in the second pixel have different intensities from each other.

5 Claims, 9 Drawing Sheets

(51) Int. Cl.

| | | |
|---|---|---|
| *G02B 27/01* | (2006.01) | |
| *G09G 3/00* | (2006.01) | |
| *G06F 3/147* | (2006.01) | |
| *H04N 13/271* | (2018.01) | |
| *H04N 13/25* | (2018.01) | |
| *H04N 13/324* | (2018.01) | |
| *G02B 30/34* | (2020.01) | |
| *H04N 13/361* | (2018.01) | |
| *G09G 3/34* | (2006.01) | |

(52) U.S. Cl.
CPC ............. *G02B 30/34* (2020.01); *G06F 3/147* (2013.01); *G09G 3/003* (2013.01); *G09G 3/2003* (2013.01); *H04N 13/25* (2018.05); *H04N 13/271* (2018.05); *H04N 13/324* (2018.05); *G09G 3/3413* (2013.01); *G09G 2360/141* (2013.01); *G09G 2360/144* (2013.01); *G09G 2370/04* (2013.01); *H04N 13/361* (2018.05)

(56) References Cited

U.S. PATENT DOCUMENTS

| | | | |
|---|---|---|---|
| 7,532,181 | B2 | 5/2009 | Tang et al. |
| 7,560,679 | B1 | 7/2009 | Gutierrez |
| 8,907,928 | B2 | 12/2014 | Yamaguchi et al. |
| 9,355,599 | B2 | 5/2016 | Wu et al. |
| 2003/0127657 | A1 | 7/2003 | Park |
| 2010/0020209 | A1 | 1/2010 | Kim |
| 2011/0147704 | A1* | 6/2011 | Jiang ............... H01L 33/44 257/13 |
| 2011/0175981 | A1 | 7/2011 | Lai et al. |
| 2011/0291116 | A1 | 12/2011 | Kang et al. |
| 2012/0113237 | A1 | 5/2012 | Izawa |
| 2012/0154277 | A1 | 6/2012 | Bar-Zeev et al. |
| 2012/0182394 | A1 | 7/2012 | Bae et al. |
| 2013/0069853 | A1 | 3/2013 | Choi |
| 2014/0293171 | A1 | 10/2014 | Jun et al. |
| 2015/0077312 | A1 | 3/2015 | Wang |
| 2015/0084054 | A1* | 3/2015 | Fan .............. G02F 1/00 257/72 |
| 2015/0103098 | A1 | 4/2015 | Sugden |
| 2015/0304638 | A1 | 10/2015 | Cho et al. |
| 2015/0364107 | A1 | 12/2015 | Sakariya et al. |

FOREIGN PATENT DOCUMENTS

| | | |
|---|---|---|
| JP | 2003317931 A | 11/2003 |
| KR | 1020120062668 A | 6/2012 |
| KR | 1020120084216 A | 7/2012 |
| KR | 1020130009573 A | 1/2013 |
| KR | 1020140028774 A | 3/2014 |
| KR | 1020140092055 A | 7/2014 |
| KR | 1020140117156 A | 10/2014 |
| KR | 1020150078901 A | 7/2015 |

OTHER PUBLICATIONS

J. Batlle, at al., "Recent progress in coded structured light as a technique to solve the correspondence problem," Pattern Recognition, 1998, pp. 963-982, vol. 31, No. 7, Elsevier Science Ltd.

* cited by examiner

DISPLAY APPARATUS, HEAD-MOUNTED DISPLAY APPARATUS, IMAGE DISPLAY METHOD, AND IMAGE DISPLAY SYSTEM

This application is a continuation of U.S. patent application Ser. No. 15/139,766, filed on Apr. 27, 2016, which claims priority to Korean Patent Application No. 10-2015-0123014, filed on Aug. 31, 2015, and all the benefits accruing therefrom under 35 U.S.C. § 119 and § 120, the contents of which in their entirety are herein incorporated by reference.

BACKGROUND

1. Field

One or more exemplary embodiments relate to a display apparatus, a head-mounted display apparatus, an image display method, and an image display system, and more particularly, to a display apparatus, a head-mounted display apparatus, an image display method, and am image display system of displaying a three-dimensional ("3D") image by emitting or using infrared rays having depth information.

2. Description of the Related Art

A head-mounted display apparatus typically refers to a display apparatus configured to be mounted on a user's head in the form of glasses or a helmet. In such a head-mounted display apparatus, images are displayed in front of the eyes of the user so that the user may recognize the images. The head-mounted display apparatus may display the images using self-generated light and/or light incident from an external source.

A light-emitting diode ("LED") is a semiconductor device, in particular, a p-n junction diode that converts energy, which is generated by a recombination of holes and electrons, into light energy. When a voltage is applied to the p-n junction diode in a forward direction, holes and electrons are injected, and a recombination of the holes and the electrons generate energy.

Inorganic LEDs emit light using inorganic compounds. The inorganic LEDs may include red, yellow, blue, white, ultraviolet and infrared LEDs. The inorganic LEDs are widely used in backlight of a liquid crystal display ("LCD") device, lighting devices, or electronic displays, for example. Also, organic LEDs emit light using organic compounds, and are widely used in small to large electronic devices, e.g., mobile phones and large screen display devices.

SUMMARY

Due to the increasing demand of three-dimensional ("3D") display apparatuses, various 3D image display methods are being studied. For example, a display apparatus, such as a television ("TV"), may project different images on left and right eyes of a user by using a polarizer, a lens array, or a shutter to display a 3D image. However, the method above has limited viewpoints and cannot simultaneously display two-dimensional ("2D") images and 3D images.

One or more exemplary embodiments include an image display method, a display apparatus, and a head-mounted display apparatus for providing a continuous wide viewing angle for a 3D display apparatus and generating augmented reality by connecting a 3D display apparatus with the head-mounted display apparatus.

According to one or more exemplary embodiments, a display apparatus includes a first pixel, and a second pixel. In such an embodiment, each of the first and second pixels includes a first sub-pixel which emits light having a first color, a second sub-pixel which emits light having a second color different from the first color, a third sub-pixel which emits light having a third color different from the first and second colors, and an infrared sub-pixel which emits infrared light. In such an embodiment, the infrared light emitted from the infrared sub-pixel in the first pixel and the infrared light emitted from the infrared sub-pixel in the second pixel have different intensities from each other.

In an exemplary embodiment, the first color, the second color and the third color may be red, green and blue, respectively.

In an exemplary embodiment, wherein the infrared light emitted from the infrared sub-pixel in the first pixel and the infrared light emitted from the infrared sub-pixel in the second pixel may have substantially the same frequency as each other.

In an exemplary embodiment, the display apparatus may further include a plurality of pixels including the first and second pixels, and a controller which controls intensities of infrared light emitted by an infrared sub-pixel in each of the plurality of pixels, based on data of a depth difference between the plurality of pixels.

In an exemplary embodiment, the infrared sub-pixel may include an infrared driver circuit, and an infrared inorganic light-emitting diode ("LED") electrically connected to and driven by the infrared driver circuit.

In an exemplary embodiment, the display apparatus may further include a first electrode electrically connected to the infrared driver circuit and contacting an end of the infrared inorganic LED, and a second electrode facing the first electrode and contacting another end of the infrared LED. In such an embodiment, the second electrode may be commonly disposed in the first sub-pixel, the second sub-pixel, the third sub-pixel and the infrared sub-pixel.

In an exemplary embodiment, the infrared sub-pixel may further include a light spreading layer which spreads infrared light emitted by the infrared inorganic LED.

In an exemplary embodiment, each of the first to third sub-pixels may include an organic light emitting diode ("OLED").

In an exemplary embodiment, each of the first to third sub-pixels may include an inorganic LED.

According to one or more exemplary embodiments, a head-mounted display apparatus includes a camera which receives visible light emitted by an object and converts the visible light into an electric signal, an infrared sensor which receives infrared light emitted by the object, a signal processor which generates 3D rendering data based on color data obtained by the camera and depth data obtained by the infrared sensor, and a display unit which receives the 3D rendering data from the signal processor and display an image corresponding to the 3D rendering data.

In an exemplary embodiment, the signal processor may include a data matching unit which matches the color data and the depth data based on a location of the object that emits the visible light and the infrared light.

In an exemplary embodiment, the head-mounted display apparatus may further include an optical device located on a path of light emitted by the display unit and which focuses the light on a predetermined area.

In an exemplary embodiment, the head-mounted display apparatus may further include a frame which accommodates the camera, the infrared sensor, the signal processor, and the display unit. In such an embodiment, the frame may be shaped to be mounted on a head of a user.

In an exemplary embodiment, the head-mounted display apparatus may further include a lens unit accommodated in the frame and located between the object and the user. In such an embodiment, the lens unit may include a transmittance adjusting unit which adjusts a transmittance of light incident from the object.

In an exemplary embodiment, the transmittance adjusting unit may include a liquid crystal.

According to one or more exemplary embodiments, an image display method using a head-mounted display apparatus includes receiving visible light and infrared light from a display apparatus, extracting color data and depth data from the visible light and the infrared light, generating 3D rendering data based on the color data and the depth data, and displaying an image corresponding to the 3D rendering data on the head-mounted display apparatus.

In an exemplary embodiment, the display apparatus may include a plurality of pixels, and each of the plurality of pixels may include a visible light sub-pixel which emits the visible light and an infrared sub-pixel which emits the infrared light.

In an exemplary embodiment, the display apparatus may further include a controller which controls intensities of infrared light emitted by the infrared sub-pixel in each of the plurality of pixels, based on data of a depth difference between the plurality of pixels.

In an exemplary embodiment, the infrared sub-pixel may include an infrared driver circuit, and an infrared inorganic light-emitting diode ("LED") electrically connected to and driven by the infrared driver circuit.

In an exemplary embodiment, the method may further include, before the generating the 3D rendering data, matching the color data and the depth data based on respective locations of the plurality of pixels in the display apparatus which emits the visible light and the infrared light.

According to one or more exemplary embodiments, an image display system includes a display apparatus including a plurality of pixels emitting visible light and infrared light and a head-mounted display apparatus configured to receive the visible light and the infrared light from the display apparatus and display image. In such an embodiment, the head-mounted display apparatus includes a camera which receives the visible light emitted by the display apparatus and converts the visible light into an electric signal, an infrared sensor which receives the infrared light emitted by the display apparatus, a signal processor which generates three-dimensional rendering data based on color data obtained by the camera and depth data obtained by the infrared sensor, and a display unit which receives the three-dimensional rendering data from the signal processor and display an image corresponding to the three-dimensional rendering data.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
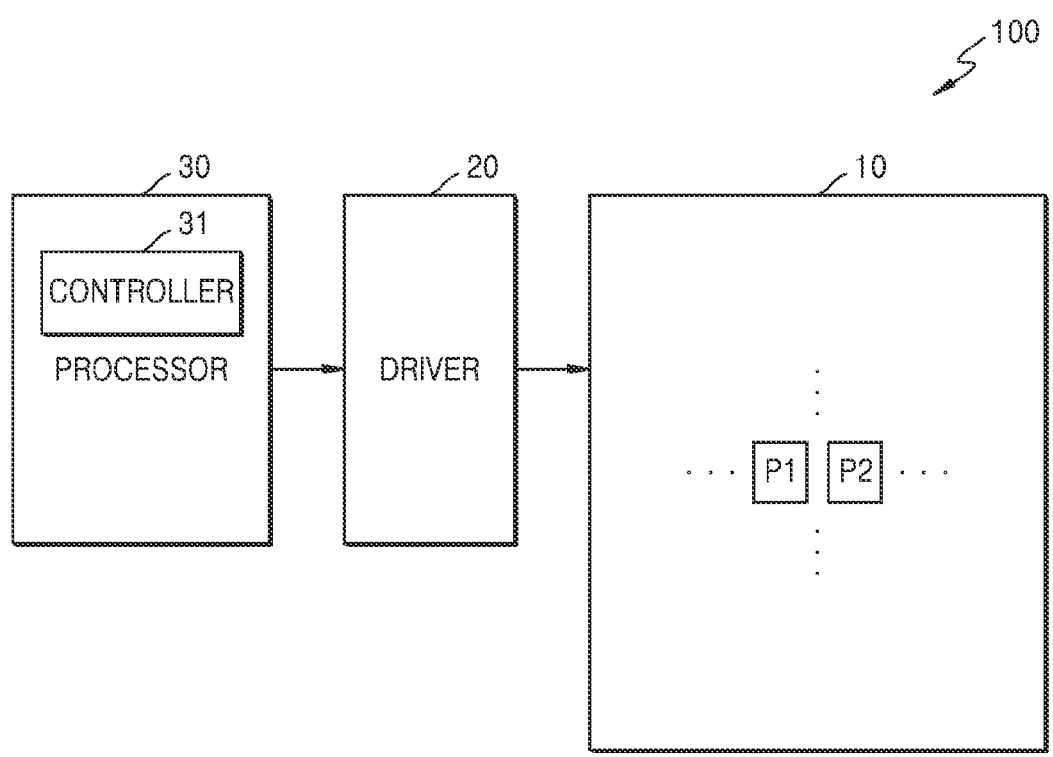
FIG. 1 is a schematic block diagram of a display apparatus, according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to the drawings.

Figure 2:
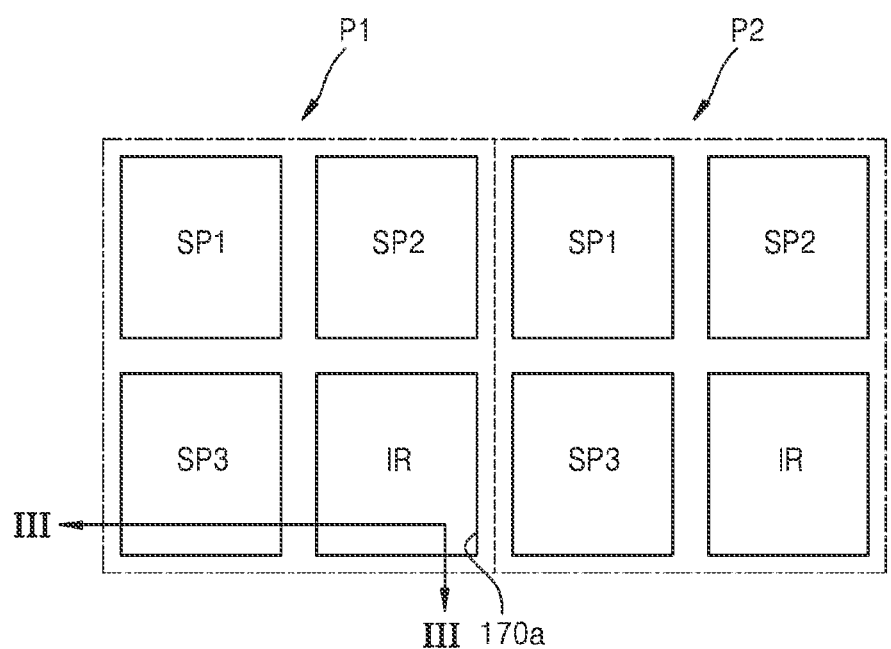
FIG. 2 is a plan view of two adjacent pixels in the display apparatus of FIG. 1.
Figure 3:
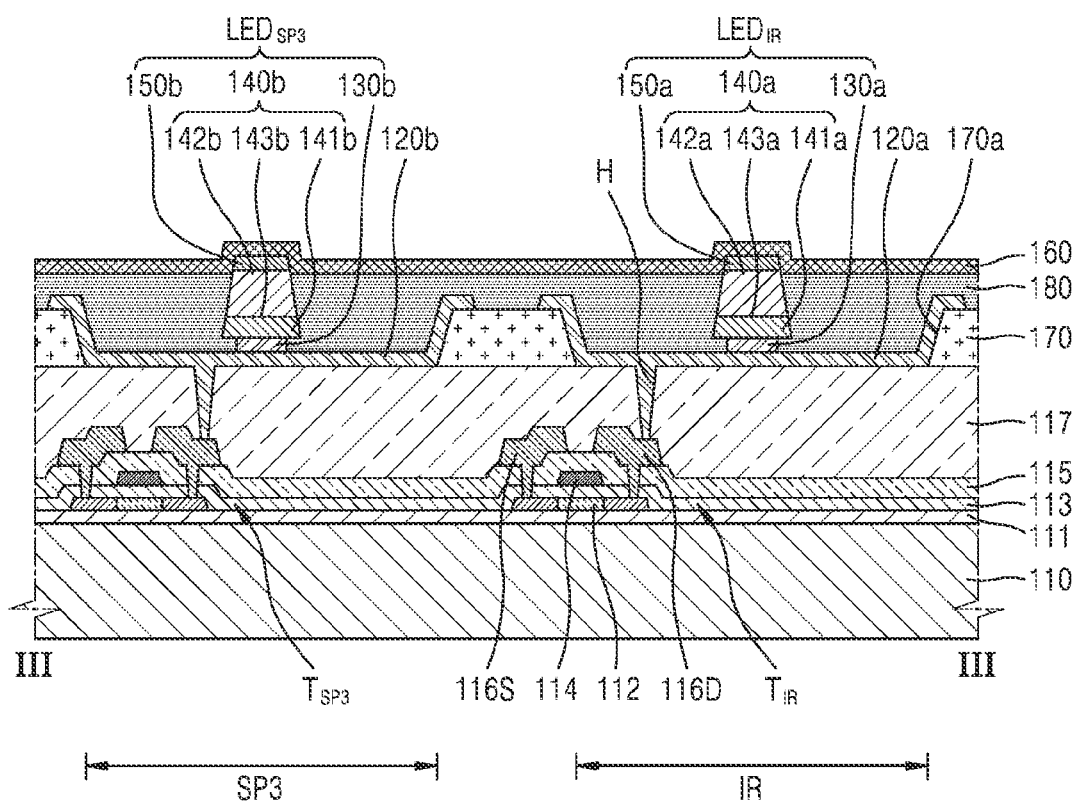
FIG. 3 is a cross-sectional view taken along line III-III of a pixel FIG. 2.

FIG. 1 is a schematic block diagram of a display apparatus 100, according to an exemplary embodiment. FIG. 2 is a plan view of two adjacent pixels in the display apparatus 100 of FIG. 1. FIG. 3 is a cross-sectional view taken along line III-III of the pixel of FIG. 2.

Referring to FIGS. 1 and 2, an exemplary embodiment of the display apparatus 100 may include a display panel 10, a driver 20, and a processor 30.

The display panel 10 may include a plurality of pixels, including a first pixel P1 and a second pixel P2. The driver 20 may include a scan driver and a data driver that respectively apply scan signals and data signals to scan lines and data lines, which are connected to the plurality of pixels. The driver 20 is connected with the processor 30, and may receive information from the processor 30, for example, information on timing for applying the scan signals and the data signals to the plurality of pixels and amplitude of signals.

FIG. 2 schematically illustrates a structure of the first and second pixels P1 and P2 from among the plurality of pixels. In an exemplary embodiment, as shown in FIG. 2, the first and second pixels P1 and P2 are adjacent to each other, but exemplary embodiments are not limited thereto. In an exemplary embodiment, other pixels may be provided between the first and second pixels P1 and P2.

Each of the first and second pixels P1 and P2 may include a first sub-pixel SP1 that emits light having a first color, a second sub-pixel SP2 that emits light having a second color that is different from the first color, a third sub-pixel SP3 that emits light having a third color that is different from the first and second colors, and an infrared sub-pixel IR that emits infrared light. The infrared light emitted from the infrared sub-pixel IR in the first pixel P1 and the infrared light emitted from the infrared sub-pixel IR in the second pixel P2 emit infrared light of different intensities.

The infrared light is provided so that depth information is included in light with a predetermined color emitted from the first and second pixels P1 and P2, a difference between intensities of infrared light emitted from the first and second pixels P1 and P2 may correspond to a depth difference between the first and second pixels P1 and P2.

Herein, the term 'depth' refers to a distance from an arbitrary point. Depth information of an image may indicate 3D information of the image. That is, the display apparatus 100 includes the plurality of pixels including the first and second pixels P1 and P2, and may display images by using the plurality of pixels. Each of the plurality of pixels may be turned on or off. When the pixels are turned on, light having a predetermined color may be emitted by using a combination of first to third sub-pixels SP1 to SP3 that emit visible light in different colors. A display apparatus including only pixels that include the first to third sub-pixels SP1 to SP3 may only display a two-dimensional ("2D") image.

In an exemplary embodiment, the display apparatus 100 includes the infrared sub-pixel IR that may include depth information in each of the plurality of pixels, and may obtain depth information of an image displayed by the display apparatus 100 from a combination of infrared light emitted from each of the plurality of pixels. Thus, the display apparatus 100 may obtain 3D information of an image displayed by the display apparatus 100 from a combination of the depth information and 2D image.

According to an exemplary embodiment, the first color, the second color and the third color may be red, green and blue, respectively, but not being limited thereto. The first to third colors may be other colors that show white light when combined, e.g., other primary colors.

According to an exemplary embodiment, the infrared sub-pixels IR of the first and second pixels P1 and P2 may emit infrared light having substantially the same frequency as each other, but exemplary embodiments are not limited thereto. In an alternative exemplary embodiment, the infrared sub-pixels IR of the first and second pixels P1 and P2 may emit infrared light having different frequencies from each other, respectively.

The processor 30 may include a controller 31 that controls intensity of infrared light emitted by the infrared sub-pixel IR in each of the plurality of pixels, based on data of a depth difference between the plurality of pixels in the display apparatus 100. The controller 31 may control the intensity of infrared light by controlling amplitude of data signals applied to the infrared sub-pixel IR or controlling time when the scan signals are applied to the infrared sub-pixel IR. Although not illustrated, the processor 30 may further include a calculator and a register.

The processor 30 may process signals by using the controller 31 so that the display apparatus 100 may display a 2D image including 3D information. A user in front of the display apparatus 100 may not see infrared light without an additional device, and may only see the 2D image displayed by the user display apparatus 100. When an additional device for receiving a processing infrared light emitted by the display apparatus 100, the user may see a 3D image displayed by the display apparatus 100, which will be described later in detail.

Although FIG. 2 illustrates an exemplary embodiment in which sub-pixels in the first and second pixels P1 and P2 are arranged in the form of a 2×2 matrix, exemplary embodiments are not limited thereto, and the sub-pixels may be arranged in various ways.

FIG. 3 is a cross-sectional view of the third sub-pixel SP3 and the infrared sub-pixel IR of the first pixel P1 of FIG. 2, according to an exemplary embodiment. Hereinafter, some elements in the third sub-pixel SP3 and the infrared sub-pixel IR will be described in detail with reference to FIG. 3.

In the first pixel P1, a buffer layer 111 is on a substrate 110. A driver circuit including a transistor $T_{IR}$ and a capacitor (not shown), and an infrared inorganic light-emitting diode ("LED") $LED_{IR}$ that is connected to and driven by the driver circuit are disposed in an area of the buffer layer 111 corresponding to the infrared sub-pixel IR.

The substrate 110 may include glass or plastic. The buffer layer 111 may effectively prevent impurities from penetrating to the driver circuit from the substrate 110, and planarizes a surface of the substrate 110. The buffer layer 111 may have a single layer structure or a multi-layer structure including a layer of an inorganic material such as silicon nitride ($SiN_x$) and/or silicon oxide ($SiO_x$).

The transistor $T_{IR}$ may include an active layer 112, a gate electrode 114, a source electrode 116S and a drain electrode 116D. The active layer 112 may have a source area and a drain area that are conductive, and a channel area between the source and drain areas. The gate electrode 114 may be disposed on the active layer 112 but insulated from the active layer 112. The source electrode 116S and the drain electrode 116D may be electrically connected with the source area and the drain area of the active layer 112, respectively. At least one of the source electrode 116S and the drain electrode 116D may be omitted.

A first insulating layer 113 may be disposed between the active layer 112 and the gate electrode 114. A second insulating layer 115 may be disposed on the first insulating layer 113 and cover the gate electrode 114. The first insulating layer 113 and the second insulating layer 115 may have a single layer structure or a multilayer structure including a layer of an inorganic material such as silicon nitride ($SiN_x$) and/or silicon oxide ($SiO_x$).

A third insulating layer 117 may be disposed on the second insulating layer 115 and cover the source electrode 116S and the drain electrode 116D. The third insulating layer 117 may include an organic material and/or an inorganic material.

Although FIG. 3 illustrates that the gate electrode 114 of the transistor $T_{IR}$ is disposed above the active layer 112, exemplary embodiments are not limited thereto. The gate electrode 114 may be disposed under the active layer 112.

A bank 170 may be disposed on the third insulating layer 117 and define a sub-pixel area. The bank 170 may include a concave area 170*a* that accommodates the infrared inorganic LED $LED_{IR}$. A height of the bank 170 may be determined based on a height of the infrared inorganic LED $LED_{IR}$ and a viewing angle. A size (e.g., a width) of the concave area 170*a* may be determined based on resolution of the display apparatus 100. Although FIG. 2 illustrates that the concave area 170*a* is square-shaped, exemplary embodiments are not limited thereto. Alternatively, the concave area 170*a* may have various shapes, for example, a polygonal, rectangular, circular, oval, or triangular shape.

The first electrode 120*a* may be disposed on a side surface and a bottom surface of the concave area 170*a* and at least a portion of an upper surface of the bank 170. The first electrode 120*a* may be electrically connected to the source electrode 116S or the drain electrode 116D of the transistor $T_{IR}$ via a hole H formed in the third insulating layer 117.

According to an exemplary embodiment, the bank 170 may function as a light blocking unit and include a material with low light transmittance. The bank 170 may effectively prevent light from being emitted through a side surface of the infrared inorganic LED $LED_{IR}$, and thus effectively prevent interference with light emitted from adjacent sub-pixels. In such an embodiment, the bank 170 may increase a bright room contrast ratio ("BRCR") of the display apparatus 100 by absorbing and blocking light incident from an external source outside the display apparatus 100. However, exemplary embodiments are not limited thereto. The bank 170 may include a semi-transparent material, an optical reflective material, or a light spreading material.

The infrared inorganic LED $LED_{IR}$ may be disposed in the concave area 170*a* of the bank 170. According to an exemplary embodiment, the infrared inorganic LED $LED_{IR}$ may be, but is not limited to, a micro LED having about 1 micrometer (μm) to about 100 μm. A single piece or a plurality of the infrared inorganic LED $LED_{IR}$ may be picked up by a transfer device from a wafer, transferred to the substrate 110, and then, accommodated in the concave area 170*a*. The infrared inorganic LED $LED_{IR}$ may emit infrared light with a wavelength of about 700 nanometers (nm) to about 1 mm. Infrared light may be not visible to the user's eyes.

The infrared inorganic LED $LED_{IR}$ may include a p-n junction diode 140*a*, a first contact electrode 130*a* and a second contact electrode 150*a*. The first contact electrode 130*a* and/or the second contact electrode 150*a* may have a single-layer structure or a multi-layer structure including at least one of metal, conductive oxide, and conductive polymer. The first contact electrode 130*a* and the second contact electrode 150*a* may selectively include a reflective layer, for example, a layer of silver. The first contact electrode 130*a* may be electrically connected to the first electrode 120*a*. The second contact electrode 150*a* may be electrically connected to a second electrode 160. The p-n junction diode 140*a* may include a p-doping layer 141*a*, an n-doping layer 142*a*, and an intermediate layer 143*a* between the p-doping layer 141*a* and the n-doping layer 142*a*. The intermediate layer 143*a* is an area that emits light as excitons generated by a recombination of electrons and holes transitions from a higher energy level to a lower energy level. The intermediate layer 143*a* includes a semiconductor material and may have a single quantum well or a multi quantum well structure.

The first electrode 120*a* may include a reflective electrode, and the second electrode 160 may include a transparent or semi-transparent electrode. The second electrode 160 may be commonly disposed in the plurality of pixels in the display apparatus 100 as a common electrode.

A passivation layer 180 may surround at least a portion of the infrared inorganic LED $LED_{IR}$ in the concave area 170*a*, and may cover the bank 170. The passivation layer 180 may have a predetermined height such that an upper portion of the infrared inorganic LED $LED_{IR}$, for example, the second contact electrode 150*a*, is not covered. Therefore, the second contact electrode 150*a* may be not covered by, but exposed through, the passivation layer 180. The exposed second contact electrode 150a may be electrically connected to the second electrode 160.

Although not illustrated, an exemplary embodiment of the display apparatus 100 may further include a light spreading layer (not shown) that spreads infrared light. The light spreading layer may be disposed on a path of infrared light emitted by the infrared inorganic LED $LED_{IR}$. The light spreading layer may be arranged in various locations and shapes. The light spreading layer may allow the infrared inorganic LED $LED_{IR}$ to uniformly emit infrared light from a front surface of the infrared sub-pixel IR to the outside, and increase an angle range, e.g., a viewing angle, of infrared light emitted by the display apparatus 100.

In an area on the buffer layer 111 corresponding to the third sub-pixel SP3, a driver circuit including a transistor $T_{SP3}$ and a capacitor, and an inorganic LED $LED_{SP3}$ that is electrically connected to the driver circuit and driven by the driver circuit.

The third sub-pixel SP3 may have substantially the same structure as the infrared sub-pixel IR described above, except for a difference in wavelengths of light emitted by the inorganic LED. The third sub-pixel SP3 may include a first electrode 120b electrically connected to the transistor $T_{SP3}$, and the inorganic LED $LED_{SP3}$ on the first electrode 120b. The inorganic LED $LED_{SP3}$ may include a first contact electrode 130b that is electrically connected to the first electrode 120b, a p-n junction diode 140b including a p-doping layer 114b, an n-doping layer 142b and an intermediate layer 143b on the first contact electrode 113b, and a second contact electrode 150b on the p-n junction diode 140b and electrically connected to the second electrode 160.

In such an embodiment, the first and second sub-pixels SP1 and SP2 of FIG. 2 may have the same structure as the third sub-pixel SP3, except for a difference in colors of light emitted by the inorganic LED.

According to an exemplary embodiment, the first to third sub-pixels SP1 to SP3 and the infrared sub-pixel IR may be disposed or transferred by an identical LED transfer device. The size of the display apparatus 100 may be easily reduced by including a small inorganic LED.

In such an embodiment, the infrared sub-pixel IR is included in each of the plurality of pixels of the display apparatus 100, such that both a 2D image and depth information corresponding to each of the plurality of pixels may be displayed.

Figure 4:
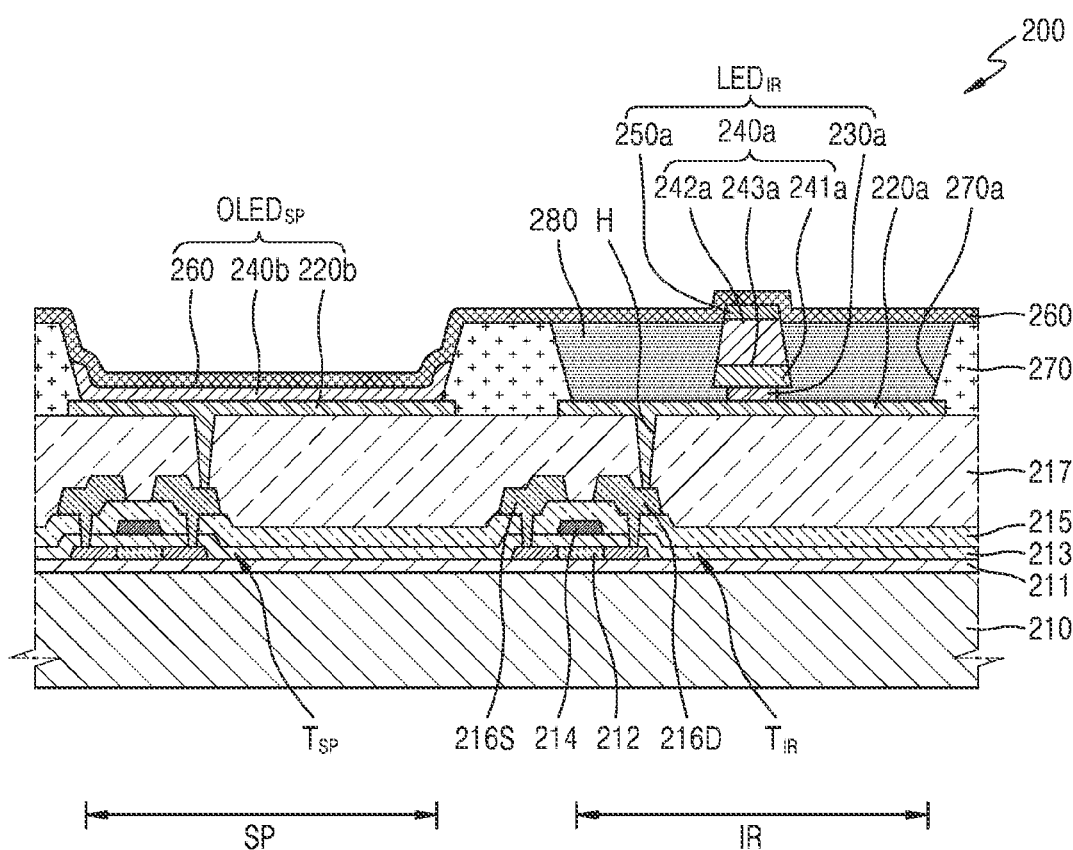
FIG. 4 is a schematic cross-sectional view of a display apparatus according to another exemplary embodiment.

FIG. 4 is a schematic cross-sectional view of a display apparatus 200 according to another exemplary embodiment.

Referring to FIG. 4, an exemplary embodiment of the display apparatus 200 may include a plurality of pixels, including a visible light sub-pixel SP that emits visible light and an infrared sub-pixel IR that emits infrared light.

In such an embodiment, the display apparatus 200 includes a substrate, and a buffer layer 211 on the substrate 210. A driver circuit including at least one transistor $T_{IR}$ and at least one capacitor (not shown), and an infrared inorganic LED $LED_{IR}$ that is connected to and driven by the driver circuit are disposed in an area of the buffer layer 211 corresponding to the infrared sub-pixel IR.

The transistor $T_{IR}$ may include an active layer 212, a gate electrode 214, a source electrode 216S, and a drain electrode 216D. A first insulating layer 213 may be disposed between the active layer 212 and the gate electrode 214. A second insulating layer 215 may be disposed on the first insulating layer 213 and cover the gate electrode 214.

A third insulating layer 217 may be disposed on the second insulating layer 215 and cover the source electrode 216S and the drain electrode 216D. A bank 270 may be disposed on the third insulating layer 217 and define a sub-pixel area. The bank 270 may include a concave area 270a that accommodates the infrared inorganic LED $LED_{IR}$.

A first electrode 220a is disposed on the third insulating layer 217. The first electrode 220a may be electrically connected with the transistor $T_{IR}$ via a hole H formed in the third insulating layer 217. Both ends of the first electrode 220a may be covered by the bank 270.

The infrared inorganic LED $LED_{IR}$ may be disposed in the concave area 270a of the bank 270. The infrared inorganic LED $LED_{IR}$ may be a micro LED with a size (e.g., a length or width) of about 1 μm to about 100 μm that emits infrared light with a wavelength in a range of about 700 nm to about 1 mm.

The infrared inorganic LED $LED_{IR}$ may include a p-n junction diode 240a, a first contact electrode 230a and a second contact electrode 250a. The p-n junction diode 240a may include a p-doping layer 241a, an n-doping layer 242a, and an intermediate layer 243a between the p-doping layer 241a and the n-doping layer 242a.

The first electrode 220a may include a reflective electrode, and a second electrode 260 may include a transparent or semi-transparent electrode. The second electrode 260 may be commonly disposed in the plurality of pixels in the display apparatus 200 as a common electrode.

A passivation layer 280 may surround at least a portion of the infrared inorganic LED $LED_{IR}$ in the concave area 270a, and may cover the bank 270 and the infrared inorganic LED $LED_{IR}$. The passivation layer 280 may have a predetermined height such that the second contact electrode 250a of the infrared inorganic LED $LED_{IR}$ is not covered. Therefore, the second contact electrode 250a may be not covered by but exposed through the passivation layer 280. The exposed second contact electrode 250a may be electrically connected to the second electrode 260.

In an area on the buffer layer 211 corresponding to the visible light sub-pixel SP, a driver circuit including a transistor $T_{SP}$ and a, and an organic LED $OLED_{SP}$ that is electrically connected to the driver circuit and driven by the driver circuit.

The visible light sub-pixel SP may include the organic LED $OLED_{SP}$ that includes a first electrode 220b electrically connected to the transistor $T_{SP}$, a second electrode 260 facing the first electrode 220b, and an organic emission layer 240b between the first electrode 220b and the second electrode 260.

According to an exemplary embodiment, the display apparatus 200 may include the visible light sub-pixel SP that includes the organic LED $OLED_{SP}$ that is appropriate for a large screen display apparatus and has fast response speed, and the infrared sub-pixel IR that includes the inorganic LED $LED_{IR}$ that generates infrared light. As in an exemplary embodiment of the display apparatus 100 described above with reference to FIG. 3, the display apparatus 200 may not only display a 2D image but also depth information corresponding to each of the plurality of pixels by including the infrared sub-pixel IR in each of the plurality of pixels.

Figure 5:
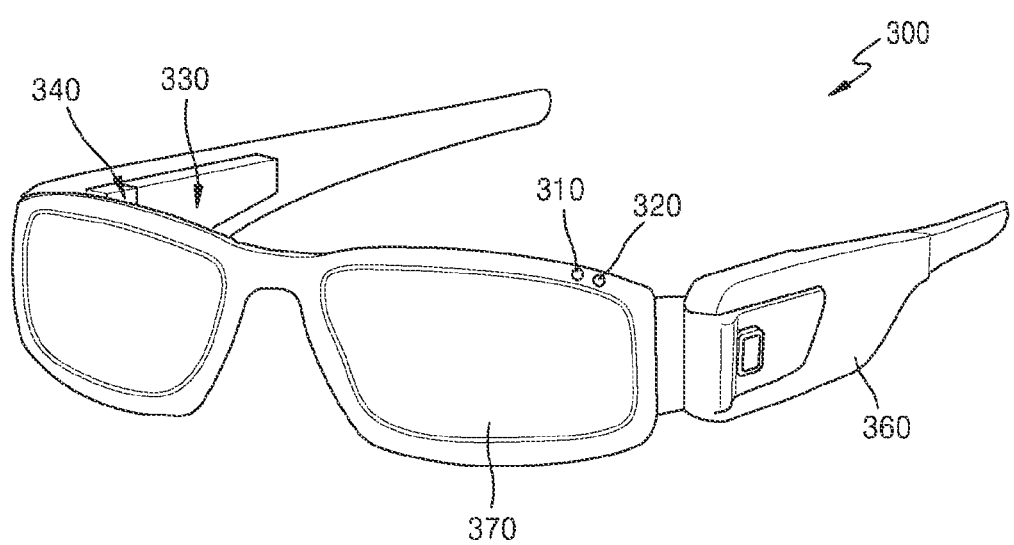
FIG. 5 is a schematic perspective view of a head-mounted display apparatus, according to an exemplary embodiment.
Figure 6:
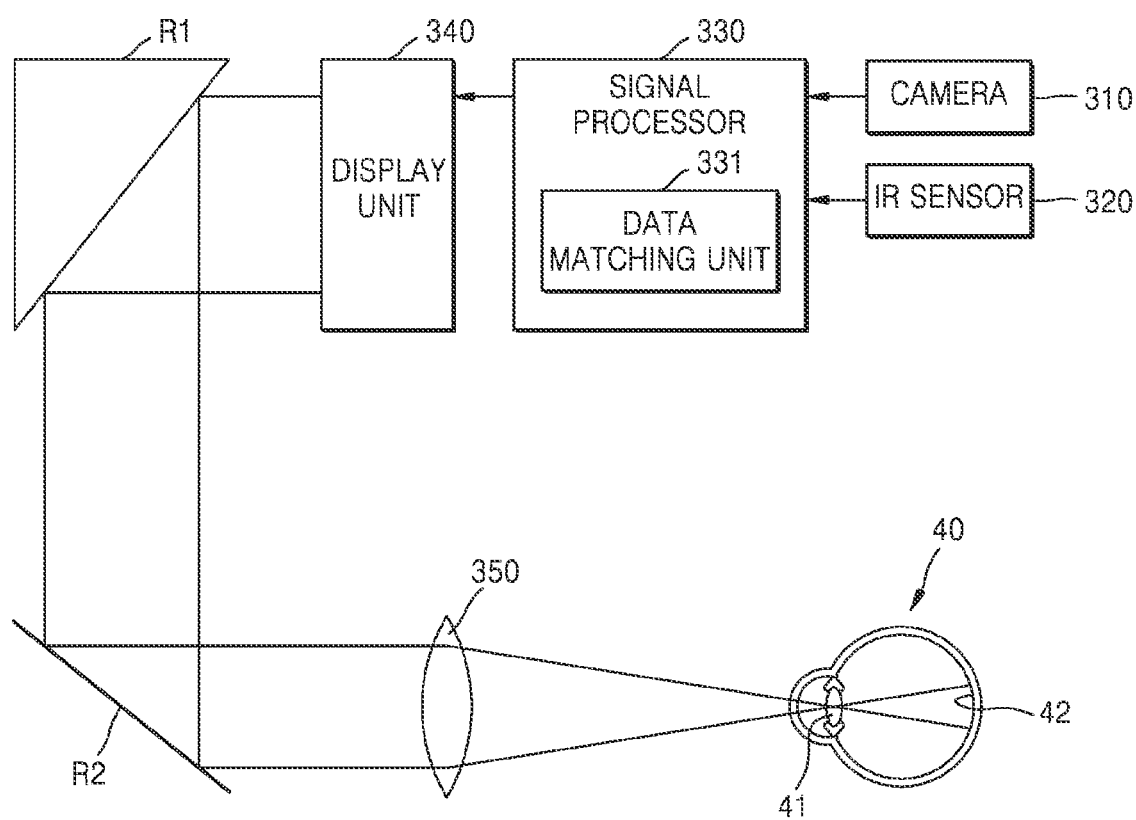
FIG. 6 is a schematic conceptual view of some components in the head-mounted display apparatus of FIG. 5.

FIG. 5 is a schematic perspective view of a head-mounted display apparatus 300, according to an exemplary embodiment. FIG. 6 is a schematic conceptual view of some components in the head-mounted display apparatus 300 of FIG. 5.

Referring to FIGS. 5 and 6, an exemplary embodiment of the head-mounted display apparatus 300 may include a camera 310 that receives visible light emitted by an object and converts the visible light into an electric signal, an infrared sensor 320 that receives infrared light emitted by the object, a signal processor 330 that generates 3D rendering data based on color data obtained by the camera 310 and depth data obtained by the infrared sensor 320, and a display unit 340 that receives 3D rendering data from the signal processor 330 and displays an image corresponding to the 3D rendering data.

The camera 310 may include an image sensor (not shown) such as a charge coupled device ("CCD") or a complementary metal-oxide semiconductor ("CMOS"), and an optical system (not shown) that focuses light incident from the object. An infrared ray block filter and/or an ultraviolet ray block filter may be disposed in front of the image sensor.

The infrared sensor 320 may also include an image sensor (not shown) such as a CCD or a CMOS. A band-pass filter that passes infrared rays of a certain frequency range and/or a block filter that blocks light having a wavelength range lower than that of visible light rays.

The camera 310 may obtain the color data of the object, e.g., color data of a 2D image of the object. The depth data of the object may be obtained by the infrared sensor 320 that receives infrared light including the depth information. The object may be the display apparatus 100 of FIG. 2 in which each of the plurality of pixels include the infrared sub-pixel IR.

The signal processor 330 may generate 3D rendering data based on the color data obtained by the camera 310 and the depth data obtained by the infrared sensor 320. Herein, '3D rendering' refers to a process of generating a 3D image by using a 2D image based on shadows, colors and density thereof, or a process of adding a 3D effect to a 2D image by changing shadows or density.

According to an exemplary embodiment, the signal processor 330 of the head-mounted display apparatus 300 may generate the 3D rendering data by combining the 2D image obtained by the camera 310 with the depth information obtained by the infrared sensor 320 and thus changing shadows or density of the 2D image. The signal processor 330 may include a data matching unit 331 that matches the color data and the depth data based on a location of the object that emits visible light and infrared light. According to an exemplary embodiment, the object may be the display apparatus 100 of FIG. 2. The data matching unit 331 may match a value of a pixel from the color data to a value of a pixel in the depth data corresponding to the pixel in the color data.

The display unit 340 may be a small display device that may be mounted on the head-mounted display apparatus 300, for example, an organic light-emitting display or a liquid crystal display ("LCD") device.

The 3D rendering data generated by the signal processor 330 may be input to the display unit 340. The display unit 340 may display an image that corresponds to the 3D rendering data. The image may be a 3D image, in particular, a 2D image with a 3D effect.

In such an embodiment, as shown in FIG. 6, optical devices R1 and R2, which changes the path of light and an optical device 350 that converges light to a predetermined area may be disposed on a path of light emitted by the display unit 340. The predetermined area may be a crystalline lens 41 of an eye 40 of the user. Light converged to the crystalline lens 41 may pass through the lens 41 and reach a retina 42 of the eye 40 of the user.

The shortest focal length of the eye of a person may be about 20 centimeters (cm) or more. According to an exemplary embodiment, even when a distance between the eye 40 of the user and the display unit 340 is smaller than the shortest focal length, the shortest focal length may be provided by the optical device 350 between the display unit 340 and the eye 40. In such an embodiment, the shortest focal length is effectively provided, such that the user may clearly and easily recognize the image displayed by the display unit 340.

FIGS. 5 and 6 illustrate an exemplary embodiment, where the display unit 340 is located beside the eye 40, rather than the front of the eye 40, and the optical devices R1 and R2 changes the path of light emitted by the display unit 340 toward a direction of the eye 40. However, exemplary embodiments are not limited thereto. In an alternative exemplary embodiment, the display unit 340 may be located in front of the eye 40, and the optical devices R1 and R2 may be omitted. According to another exemplary embodiment, the display unit 340 may be a transparent display by which the user may not only see the image displayed by the display unit 340, but also see the external background.

According to an exemplary embodiment, the head-mounted display apparatus 300 may include a frame 360 that accommodates the camera 310, the infrared sensor 320, the signal processor 330 and the display unit 340. The frame 360 may be shaped such that the frame 360 may be disposed or mounted on the head of the user. In such an embodiment, the frame 360 may include a lens unit 370 that is disposed between the object and the user.

In an exemplary embodiment, the lens unit 370 may include a transparent or semi-transparent lens to generate augmented reality. In such an embodiment, the user may not only see the image displayed by the display unit 340 in the head-mounted display apparatus 300, but also the background image passing through the lens unit 370.

However, exemplary embodiments are not limited thereto. In an alternative exemplary embodiment, the lens unit 370 may be configured as an opaque lens to generate virtual reality. In such an embodiment, the user wearing the head-mounted display apparatus 300 may only see the image displayed by the display unit 340.

Figure 7:
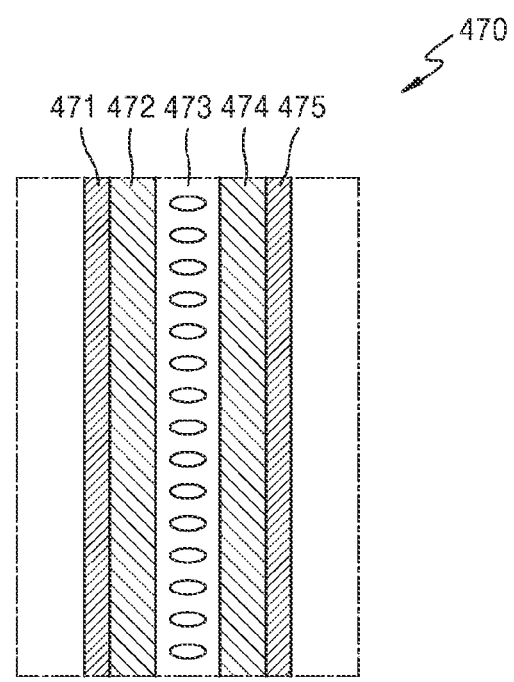
FIG. 7 is a schematic cross-sectional view of an exemplary embodiment of a lens unit in the head-mounted display apparatus of FIG. 5.

FIG. 7 is a schematic cross-sectional view of an exemplary embodiment of the lens unit 370 in the head-mounted display apparatus 300 of FIG. 5.

In an exemplary embodiment, the lens unit 370 of the head-mounted display apparatus 300 of FIG. 5 may be a lens unit 470 shown in FIG. 7.

The lens unit 470 may be disposed between the object and the user, be accommodated in the frame 360 of FIG. 5, and include a transmittance adjusting unit for adjusting transmittance of light incident from the object.

According to an exemplary embodiment, the transmittance adjusting unit may include a liquid crystal 473 (e.g., a liquid crystal layer or liquid crystal molecules). In such an embodiment, the lens unit 470 may include a first polarizer 471, a first substrate 472, the liquid crystal 473, a second substrate 474, and a second polarizer 475. The transmittance of the lens unit 470 may be adjusted by controlling an arrangement direction of the liquid crystal 473 by applying an electric field to the liquid crystal 473.

In such an embodiment, the head-mounted display apparatus 300 may selectively display augmented reality in which the image displayed by the display unit 340 of FIG. 5 and the external background are visible, or virtual reality in which the external background is not visible.

Although FIG. 7 illustrates an exemplary embodiment of the transmittance adjusting unit including the liquid crystal 473, exemplary embodiments are not limited thereto. Alternatively, the transmittance adjusting unit may have various structures, for example, a light blocking unit may be or not be disposed in front of a transparent lens to transmit or not transmit light incident from an external background.

Figure 8:
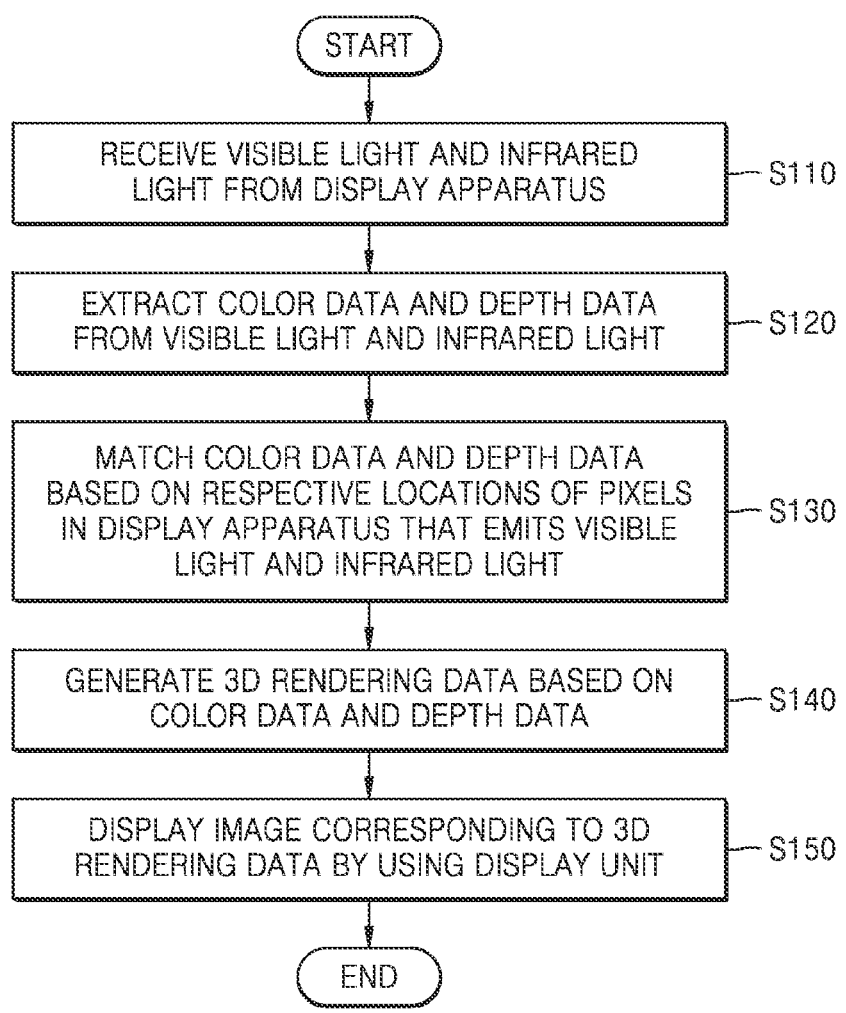
FIG. 8 is a flowchart of an image display method, according to an exemplary embodiment.
Figure 9:
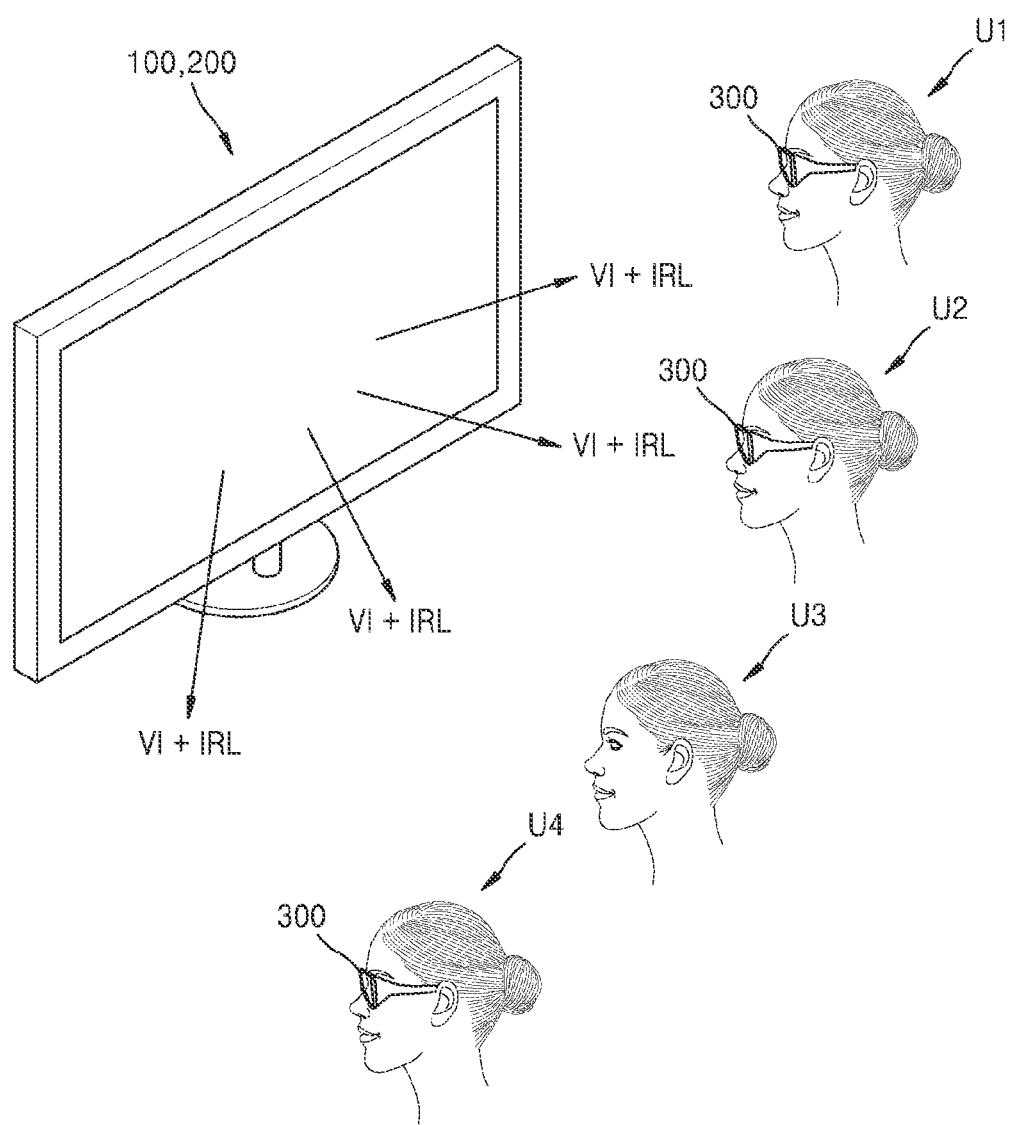
FIG. 9 is a conceptual view of a system for providing the image display method of FIG. 8, according to an exemplary embodiment.

FIG. 8 is a flowchart of an image display method, according to an exemplary embodiment. FIG. 9 is a conceptual view of a system for providing the image display method of FIG. 8, according to an exemplary embodiment.

Referring to FIGS. 8 and 9, an exemplary embodiment of the image display method of the head-mounted display apparatus 300 may include receiving visible light and infrared light emitted from the display apparatus 100 or 200 (S110), extracting color data and depth data respectively from visible light and infrared light (S120), generating 3D rendering data based on the color data and the depth data (S140), and displaying an image corresponding to the 3D rendering data (S150).

According to an exemplary embodiment, the display apparatus 100 or 200 may be the display apparatus 100 of FIGS. 1 to 3 or the display apparatus 200 of FIG. 4, and the head-mounted display apparatus 300 may be the head-mounted display apparatus 300 of FIG. 5. However, exemplary embodiments are not limited thereto. The display apparatus and the head-mounted display apparatus may be modified in various ways.

Each of the display apparatuses 100 and 200 includes a plurality of pixels. Each of the plurality of pixels may include the visible light sub-pixels SP1, SP2, SP3, and SP that emit visible light and the infrared sub-pixel IR that emits infrared light. The display apparatus 100 or 200 may include the controller 31 of FIG. 1 that controls intensity of infrared light emitted by the infrared sub-pixel IR in each of the plurality of pixels, based on data of a depth difference between the plurality of pixels.

Such an embodiment of the display apparatus 100 or 200 have been described above with reference to FIGS. 1 to 4, and any repetitive detailed description thereof will be omitted.

According to an exemplary embodiment, before the generating of the 3D rendering data (S140), the image display method may further include matching the color data and the depth data based on respective locations of the plurality of pixels in the display apparatus 100 or 200 that emits visible light and infrared light (S130).

The head-mounted display apparatus 300 of FIG. 5 may include the camera 310, the infrared sensor 320, the signal processor 330 and the display unit 340. The camera 310 and the infrared sensor 320 may perform the receiving of visible light and infrared light emitted from the display apparatus 100 or 200 (S110) and the extracting of the color data and the depth data respectively from visible light and infrared light (S120). The signal processor 330 may perform the generating of the 3D rendering data based on the color data and the depth data (S140). The display unit 340 may perform the displaying of the image corresponding to the 3D rendering data (S150).

In such an embodiment, the matching of the color data and the depth data (S130) may be performed by the data matching unit 331 in the signal processor 330 of the head-mounted display apparatus 300.

Referring to FIG. 9, the image displayed by the display apparatus 100 or 200 may include visible light VL that is visible to the user and infrared light IRL that is invisible to the user. The image may be emitted not only in a normal direction to a main plane on which the image of the display apparatus 100 or 200 is displayed, but also within an angle range with respect to the normal direction. The angle range may be equal to or greater than about ±60°. As shown in FIG. 9, some users U1 to U4 may be located at an angle range equal to or greater than about 120° with respect to the display apparatus 100. The users U1 to U4 may simultaneously watch the image displayed by the display apparatus 100 or 200.

Light emitted from the display apparatus 100 or 200 may be simultaneously observed by the users U1, U2, U3 and U4 that are located within a predetermined angle range in front of the display apparatus 100 or 200. However, the user U3 that is not wearing the head-mounted display apparatus 300 may not see the infrared light IRL but only see the visible light VL. That is, the user U3 may only see the 2D image on the display apparatus 100 or 200.

However, the users U1, U2, and U4 that are wearing the head-mounted display apparatus 300 may see a 3D image, e.g., a 2D image with a 3D effect, according to the above-described image display method.

The users U1, U2, and U4 may be located in front of the display apparatus 100 or 200, and simultaneously see the 3D image displayed by the display apparatus 100 or 200. In such an embodiment, as described above, the user U3 that is not wearing the head-mounted display apparatus 300 sees only the 2D image. Therefore, 2D and 3D images may be simultaneously displayed without changing a mode of the display apparatus 100 or 200.

According to the exemplary embodiments described herein, the display apparatuses 100 and 200 and the head-mounted display apparatus 300 may simultaneously display the 2D and 3D images, and may provide a continuous wide viewing angle for the 3D image.

In such embodiments, the head-mounted display apparatus 300 and the image display method may easily generate augmented reality by connecting with the display apparatus 100 or 200.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus for displaying a two-dimensional (2D) image, comprising:
    a display panel which displays the 2D image and includes a base substrate, and
    a plurality of pixels included in the display panel and including a first pixel and a second pixel,
    wherein each of the plurality of pixels comprises:
        a visible light sub-pixel which comprises an organic light emitting diode and emits visible light towards a viewer; and
        an infrared sub-pixel which comprises an infrared inorganic light-emitting diode and emits infrared light having depth information of a part of the 2D image represented by the visible light emitted from the visible light sub-pixel towards the viewer,
    wherein the display apparatus further comprises a bank comprising a concave area in which the infrared inorganic light-emitting diode is disposed, and a passivation layer disposed in the bank and surrounding the infrared inorganic light-emitting diode,
    wherein a second electrode is commonly disposed in the visible light sub-pixel including the organic light emitting diode and the infrared sub-pixel including the infrared inorganic light-emitting diode, and the second electrode overlaps the passivation layer and the infrared inorganic light-emitting diode,
    a distance from the substrate to the second electrode in the visible light sub-pixel including the organic light emitting diode in a thickness direction of the substrate is smaller than a distance from the substrate to the second electrode in the infrared sub-pixel including the infrared inorganic light-emitting diode in the thickness direction, the depth information of the 2D image indicates three-dimensional (3D) information of the 2D image, and the 2D image displayed by the display apparatus, not a 3D image corresponding to the 2D image, is shown to the viewer with naked eyes, and wherein the display apparatus further comprises:

a controller which controls an intensity of infrared light emitted by an infrared sub-pixel in each of the plurality of pixels, based on data of a depth difference between the plurality of pixels.

2. The display apparatus of claim 1, wherein the infrared light emitted from the infrared sub-pixel in the first pixel and the infrared light emitted from the infrared sub-pixel in the second pixel have substantially the same frequency as each other.

3. The display apparatus of claim 1, wherein the infrared sub-pixel further comprises an infrared driver circuit, wherein the infrared inorganic light-emitting diode is electrically connected to and driven by the infrared driver circuit.

4. The display apparatus of claim 3, further comprising:

a first electrode electrically connected to the infrared driver circuit and contacting an end of the infrared inorganic light-emitting diode; and the second electrode facing the first electrode and contacting another end of the infrared light-emitting diode;

wherein the passivation layer is surrounded by the first electrode, the second electrode, and the bank.

5. The display apparatus of claim 3, wherein the infrared sub-pixel further comprises a light spreading layer which spreads infrared light emitted by the infrared inorganic light-emitting diode.

* * * * *